United States Patent

Tanoue et al.

[11] Patent Number: 5,155,674
[45] Date of Patent: Oct. 13, 1992

[54] OVERVOLTAGE PROTECTION CIRCUIT FOR AN ENERGY ABSORBING CAPACITOR

[75] Inventors: Yoshiro Tanoue; Akira Kawaguchi, both of Tokyo, Japan

[73] Assignee: Kabushiki Kaisha Toshiba, Kawasaki, Japan

[21] Appl. No.: 667,583

[22] Filed: Mar. 11, 1991

[30] Foreign Application Priority Data

Mar. 9, 1990 [JP] Japan .................... 2-58428

[51] Int. Cl.$^5$ .................. H02H 7/122; H02M 1/06
[52] U.S. Cl. .................. 363/58; 361/91; 363/56
[58] Field of Search .................. 363/56–58; 361/91, 111

[56] References Cited

U.S. PATENT DOCUMENTS

| | | | |
|---|---|---|---|
| 4,378,586 | 3/1983 | Bete | 363/56 |
| 4,703,411 | 10/1987 | Umbricht | 363/57 |
| 4,926,306 | 5/1990 | Ueda et al. | 363/58 |
| 4,947,282 | 8/1990 | Kobayashi | 361/91 |

FOREIGN PATENT DOCUMENTS

| | | | |
|---|---|---|---|
| 2329887 | 10/1974 | Fed. Rep. of Germany | 361/91 |
| 63076 | 4/1983 | Japan | 363/58 |

*Primary Examiner*—William H. Beha, Jr.
*Attorney, Agent, or Firm*—Oblon, Spivak, McClelland, Maier & Neustadt

[57] ABSTRACT

A protection device for a power converter utilizing GTO thyristors. A reactor is connected in series with the switching elements to suppress the current change rates. A capacitor is connected to the reactor by way of a coupling diode to receive and store energy from the reactor. An overvoltage prevention device is connected in parallel with the capacitor to keep the voltage of the capacitor below a set value. A single protection device may be utilized with a polyphase converter or a multiplex converter, thus providing a compact low cost protection device.

12 Claims, 6 Drawing Sheets

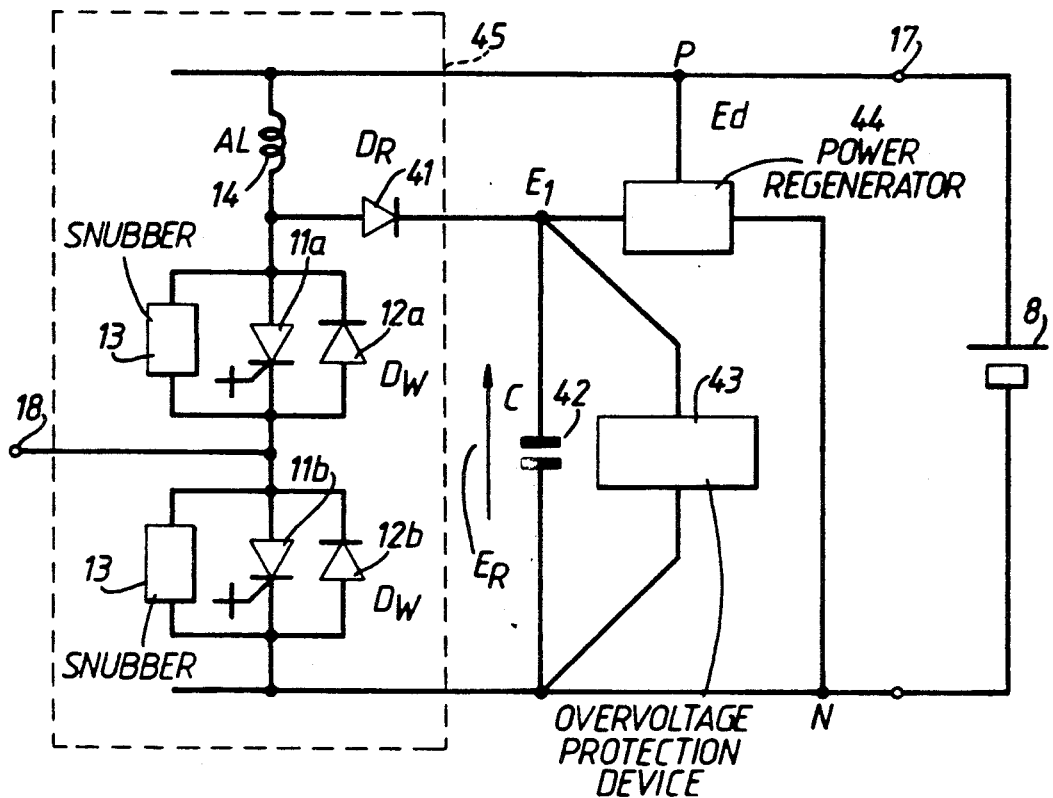
*Fig.1.*
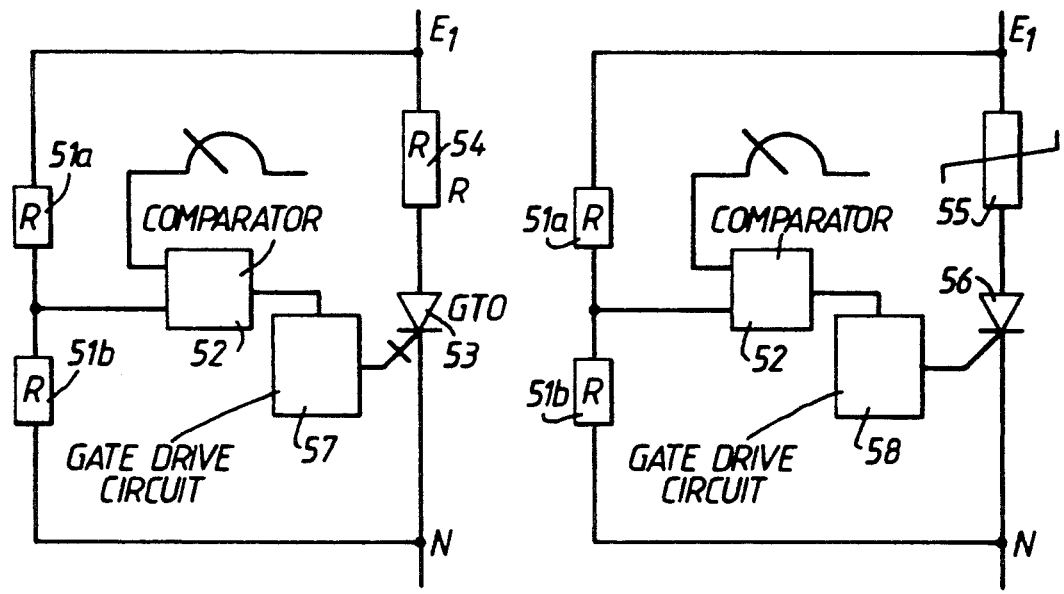
*Fig.2(a).*        *Fig.2(b).*

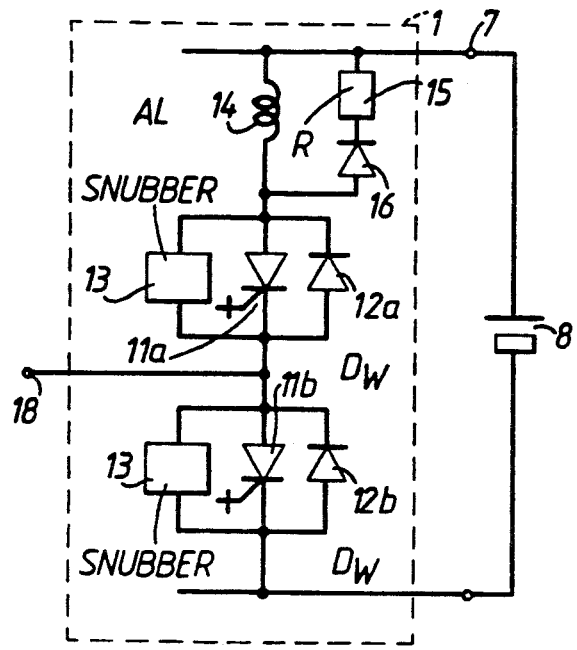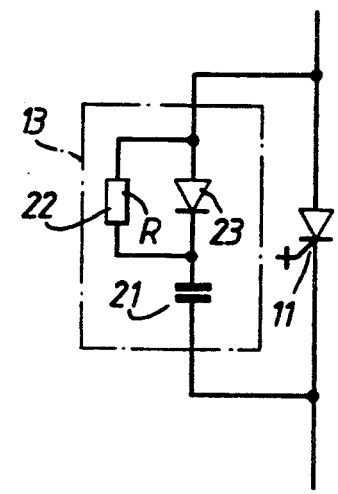
Fig.10(a).
PRIOR ART
Fig.10(b).
PRIOR ART
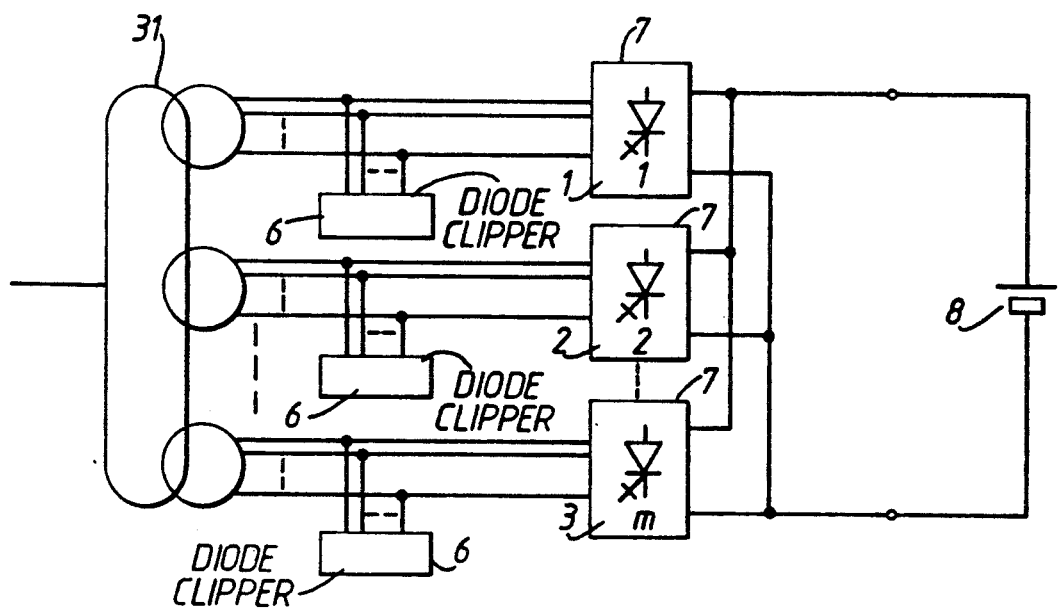
Fig.11.
PRIOR ART

OVERVOLTAGE PROTECTION CIRCUIT FOR AN ENERGY ABSORBING CAPACITOR

BACKGROUND OF THE INVENTION

1. Field of the Invention

The present invention relates generally to a power converter protection device and more particularly to a protection device for a power converter which employs gate turn-off thyristors which reduces overvoltages from external surges.

2. Discussion of the Background

In order to avoid damage to the switching elements in a power converter, it has been common to provide a protection device. When the power converter has employed gate turn-off thyristors (GTOs), a diode clipper may be utilized as a protection device, as shown in FIG. 9.

The power converter 7 is made up of a plurality of arm modules 1 each of which contains GTOs or similar switching elements. Terminal 17, connected to the current side of the converter, serves as connection to a direct current power supply 8. The power converter is connected on the other side through alternating current terminals 18. The diode clipper 6 is also connected to each of the AC terminals. Diodes 2 are provided on either side of the connection to the AC terminals for rectification. Capacitor 3 is provided to absorb external surges. Resistor 4 limits the current applied thereto and resistor 5 acts as a discharge path.

FIG. 10a shows an example of the arm modules 1 used in FIG. 9. GTOs 11a and 11b act as switching elements, diodes 12a and 12b act as flywheel diodes and elements 13 are snubber circuits. Reactor 14 is provided to keep the rate of change of the current low. Resistor 15 consumes the energy of the reactor while diode 16 restricts the direction of the current flow through the resistor. The configuration of the snubber circuit 13 is shown in FIG. 10b. The circuit includes capacitor 21, resistor 22 and diode 23.

Normally, in a GTO power converter it has been conventional practice to prevent overvoltages from external surges entering from the AC side by using a circuit such as diode clipper 6 to protect the switching elements. The operation of this diode clipper is described below.

The capacitor 3 is charged up to the peak voltage of the alternating current circuit by way of the rectification diode 2 and normally no current flows into the capacitor 3. However, when an overvoltage occurs from an external surge on the AC side, the rectification diode 2 becomes conductive and the low impedance of capacitor 3 is connected to the AC side to suppress the overvoltage. Accordingly, these switching elements are protected from the overvoltage.

When a multiplex power converter is utilized, the diode clipper must assume the configuration shown in FIG. 11. A diode clipper 6 must be provided for each converter 7 in order to provide overvoltage protection. Transformer 31 acts as a multiplexer for the power converters.

Thus, in this type of arrangement it is necessary to provide one overvoltage device for each converter. If the power converter capacity is increased utilizing power converter multiplexing, it is necessary to provide an overvoltage device for each multiplex channel. Thus, the size of the equipment becomes large and the cost of the device becomes high.

SUMMARY OF THE INVENTION

Accordingly, it is one object of the present invention to provide a compact low cost power converter protection device.

It is another object of this invention to provide an overvoltage protection device which can be used for a group of polyphase multiplexed converters.

It is another object of this invention to provide an overvoltage protection device which may be used with a plurality of converters.

Briefly, these and other objects of the invention are achieved by providing a reactor in series with the switching elements to suppress current change rates. An energy storage device is provided for receiving energy stored in the reactor through a coupling diode. An overvoltage prevention device is connected to opposite terminals of the energy storage device to keep the value of the voltage of the energy storage device below a set value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a block diagram showing a first embodiment of the power converter protection device of the present invention;

FIG. 2a and 2b are is a circuit diagram showing an examples of the overvoltage protection device of FIG. 1;

FIG. 10a is a circuit diagram showing a prior art arm module;

FIG. 10b is a circuit diagram of a snubber circuit shown in FIG. 10a; and

FIG. 11 is a block diagram of a prior art protection circuit for a multiplexed converter.

DESCRIPTION OF THE PREFERRED EMBODIMENT

Figure 3:
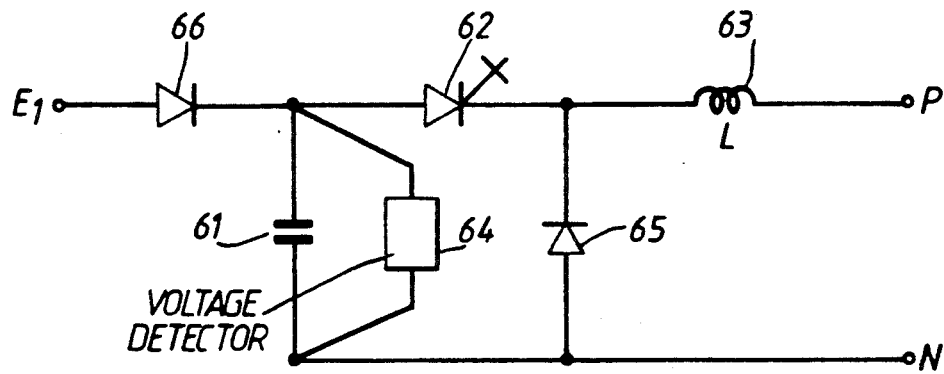
FIG. 3 is a circuit diagram showing an example of the power regenerator shown in FIG. 1.

Various other objects, features and attendant advantages of the present invention will be more fully appreciated as the same becomes better understood from the following detailed description when considered in connection with the accompanying drawings in which like reference characters designate like or corresponding parts throughout the several views and wherein FIG. 1 shows a basic configuration of a power converter protection device according to the present invention. Arm module 45 includes switching elements 11a and 11b, flywheel diodes 12a and 12b, snubber circuits 13, reactor 14 and a coupling diode 41. This arm module operates in a similar fashion to that shown in FIG. 10a. Similar elements have been identified by similar numbers and operate in the same fashion as described in that figure.

A surge absorption capacitor 42 acts as an energy storage device. It is coupled to reactor 14 through coupling diode 4 and acts to store energy from the reactor 14. Overvoltage protection device 43 keeps the voltage of the capacitor 42 below a set value. Power regenerator 44 regenerates the power of the capacitor to the direct current side.

FIGS. 2a and 2b show two examples of overvoltage protection devices shown in FIG. 1. In each case, resistors 51a and 51b act as voltage dividing resistors. Voltage comparator 52 compares the voltage at a point between the two resistors to a preset voltage. The output of the comparator is connected to gate drive circuit which is used to trigger a switching element. In FIG. 2a, the gate drive circuit 57 supplies a gate pulse to GTO 53. In FIG. 2b the gate drive circuit 58 supplies a gate pulse in the form of a light signal to a light triggered thyristor 56. Thus, the voltage $E_R$ of capacitor 42 is detected and compared with the set value to switch on a switching element when the capacitor voltage is greater than the set value. The current then flows from the capacitor 42 through the resistor 54 in FIG. 2a or the arrester 55 in FIG. 2b. The arrester 55 has a low resistance and a large current will flow when the voltage of the capacitor 42 is at a high value. The arrester 55 has a high resistance and the current through the thyristor 56 becomes very small when the voltage of the capacitor is less than a predetermined value and the thyristor is turned off.

FIG. 3 shows an example of a power regenerator 44 shown in FIG. 1. Capacitor 61 acts as a regenerator. Switching element 62 may be a GTO. Voltage detector 64 is connected across the regenerator capacitor. Diode 65 is a reflux diode while diode 66 is a counter-current prevention diode. If the voltage of capacitor 42 becomes larger than a set value, the power generator 44 performs a power regeneration action so that the energy of capacitor 44 is returned to the direct current power source. The voltage of capacitor 42 is thus lowered and more or less kept constant at the set value.

Capacitor 42 has a small capacity but must occasionally handle a high frequency current such as the current due to external surges or anode reactor energy. When the voltage of capacitor 42 exceeds a predetermined value, the overvoltage prevention device lowers the voltage of capacitor 42 to the predetermined value. Thus capacitor 42 is not discharged completely but is maintained near the predetermined value.

Capacitor 61 of the power regenerator has a large capacity. This capacitor is charged from capacitor 42 over a relatively long time. The voltage of this capacitor is lowered by a chopper operation.

The device shown in FIGS. 1-3 operates to protect the switches of the power converter. During normal operation, after the switching element 11a is turned off, current flowing in suppression reactor 14 is carried by the coupling diode 41 to capacitor 42. Since an LC resonance circuit is formed, energy migrates from reactor 14 to capacitor 42 and the voltage of the capacitor rises. The migrated energy is then returned from the capacitor to the direct current side 17 by power regenerator circuit 44.

However, if an external surge is imposed from the alternating current side 18, capacitor 42 absorbs the surge through the flywheel diode 12a and coupling diode 41. Since the surge is absorbed by the low impedance of the capacitor, a high voltage on the switching elements is prevented. Thus, current flows into the capacitor and the voltage of the capacitor rises. When the voltage of the capacitor exceeds a set value, the overvoltage prevention device 43 comes into operation. The overvoltage prevention device constitutes a low impedance path in parallel with the capacitor. The current that was flowing into the capacitor is instead led into the low impedance path, this results in the capacitor being discharged so that its voltage is prevented from rising and is instead lowered to the set value.

Accordingly, when the overvoltage is relatively small, it can be prevented by capacitor 42 alone. However when the overvoltage is relatively large, the power it supplies must be momentarily consumed by an overvoltage prevention device 43 to prevent any overvoltage of switching elements 11a and 11b.

Thus, since external surges are absorbed by capacitor 42 and overvoltage prevention device 43, it is possible to ensure the protection of the switching elements against overvoltage from the alternating current side of the power converter. Furthermore, while this circuit is simple it makes it possible to collectively protect a polyphase circuit. Thus, regardless of the number of phases, only a single overvoltage prevention device 43 is required. This allows the device to be made much smaller and more cheaply than conventional protection devices. Thus the protection device of the present invention is very effective for large capacity converters and especially for multiplex power converters.

Figure 4:
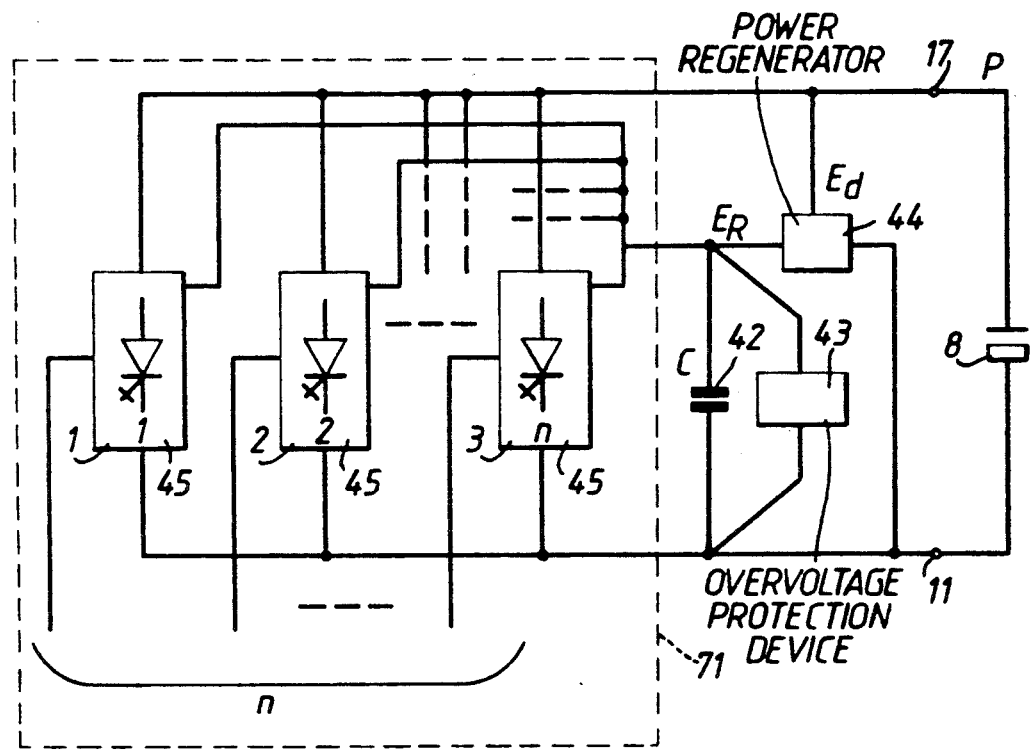
FIG. 4 is a block diagram showing another embodiment of the present invention where a polyphase converter is utilized.

FIG. 4 shows the use of the present invention in a polyphase converter. Polyphase converter 71 is made of a plurality of arm modules 45, each of which corresponds to an arm module shown in FIG. 1. This converter can be protected by using a capacitor 42, overvoltage prevention device 43 and power regenerator 44 in a manner similar to that shown in FIG. 1. However, in this case only a single protection device is needed and is connected commonly to each of the arm modules.

Figure 5:
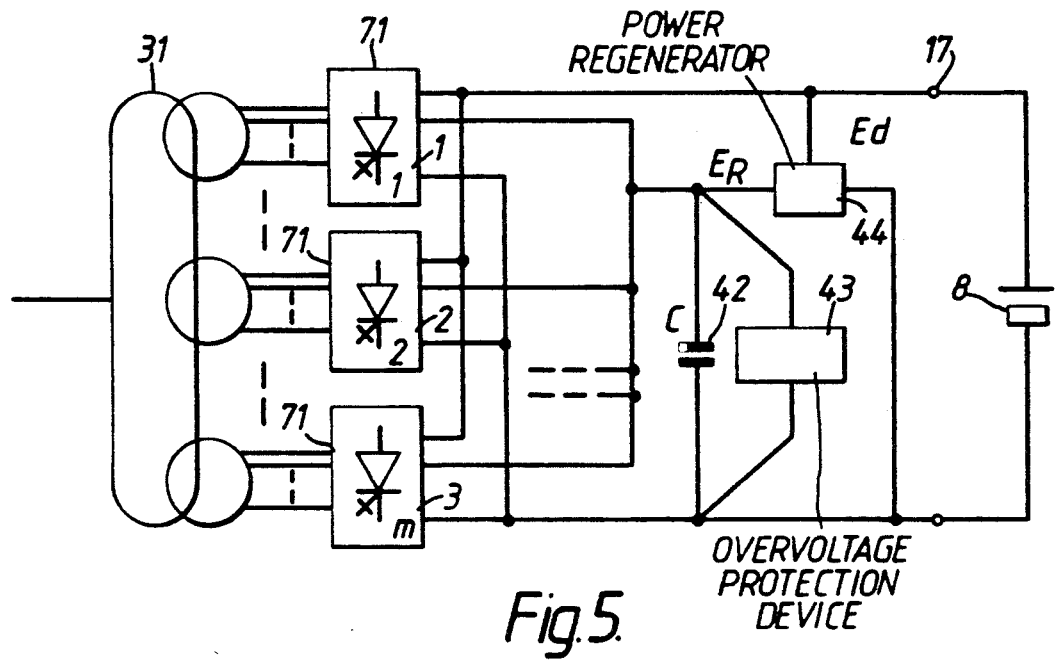
FIG. 5 is a block diagram showing another embodiment of the invention for a multiplexed converter.

Likewise, FIG. 5 shows a configuration where a single protection device is utilized for a multiplex converter. The multiplex unit utilizes a plurality of converters 71 such as shown in FIG. 4. The protection device again only utilizes a single capacitor 42, overvoltage prevention device 43 and power regenerator 44 to protect the entire multiplexed unit. The protection device is commonly connected to each of the converters 71. As can be seen, the use of the present invention makes the construction of such a converter more compact and less expensive to make since the power converters share a single protection device.

Figure 6:
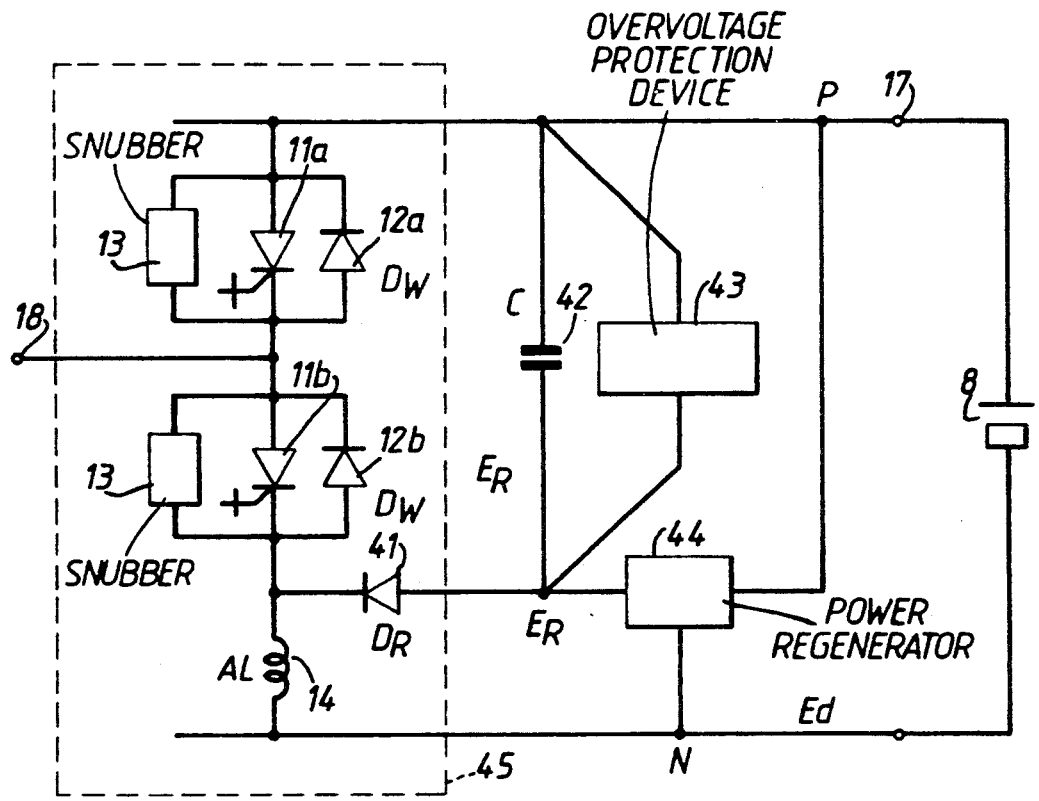
FIG. 6 is a block diagram showing another embodiment of the invention utilizing a different polarity.

FIG. 6 shows a modification of the device shown in FIG. 1. In FIG. 6, the reactor 14 is provided on the negative side rather than on the positive side. The protection device may be utilized in a similar fashion to that of FIG. 1 merely by reversing the polarities of the overvoltage prevention circuit 43 and power regenerator 44. The device otherwise operates in a fashion similar to that of FIG. 1.

Figure 7:
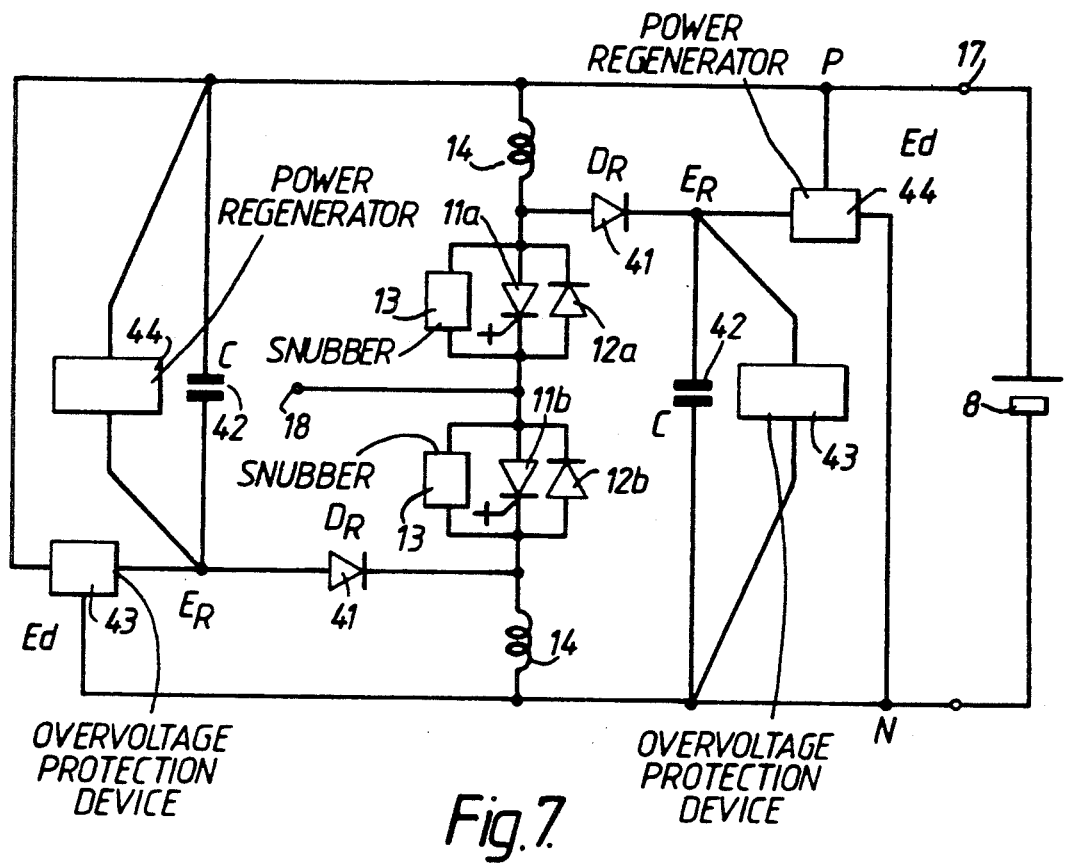
FIG. 7 is a block diagram of another embodiment of the invention combining the embodiments of FIGS. 1 and 6.

It is also possible to utilize the present invention where reactors are provided on both the positive and negative sides. FIG. 7 shows a device formed by combining the embodiments shown in FIG. 1 and FIG. 6 into a single device. In this manner, protection is provided on both sides of the circuit.

Figure 8:
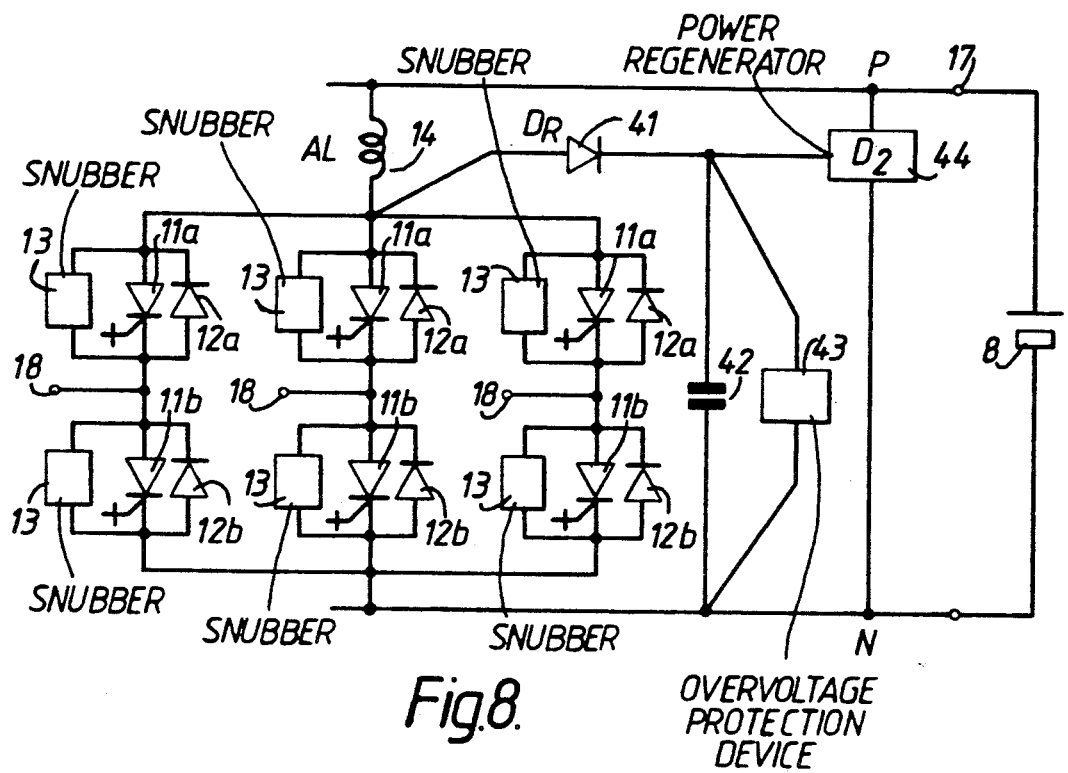
FIG. 8 is a block diagram of an embodiment of the invention utilizing a single protection device with plural arms.
Figure 9:
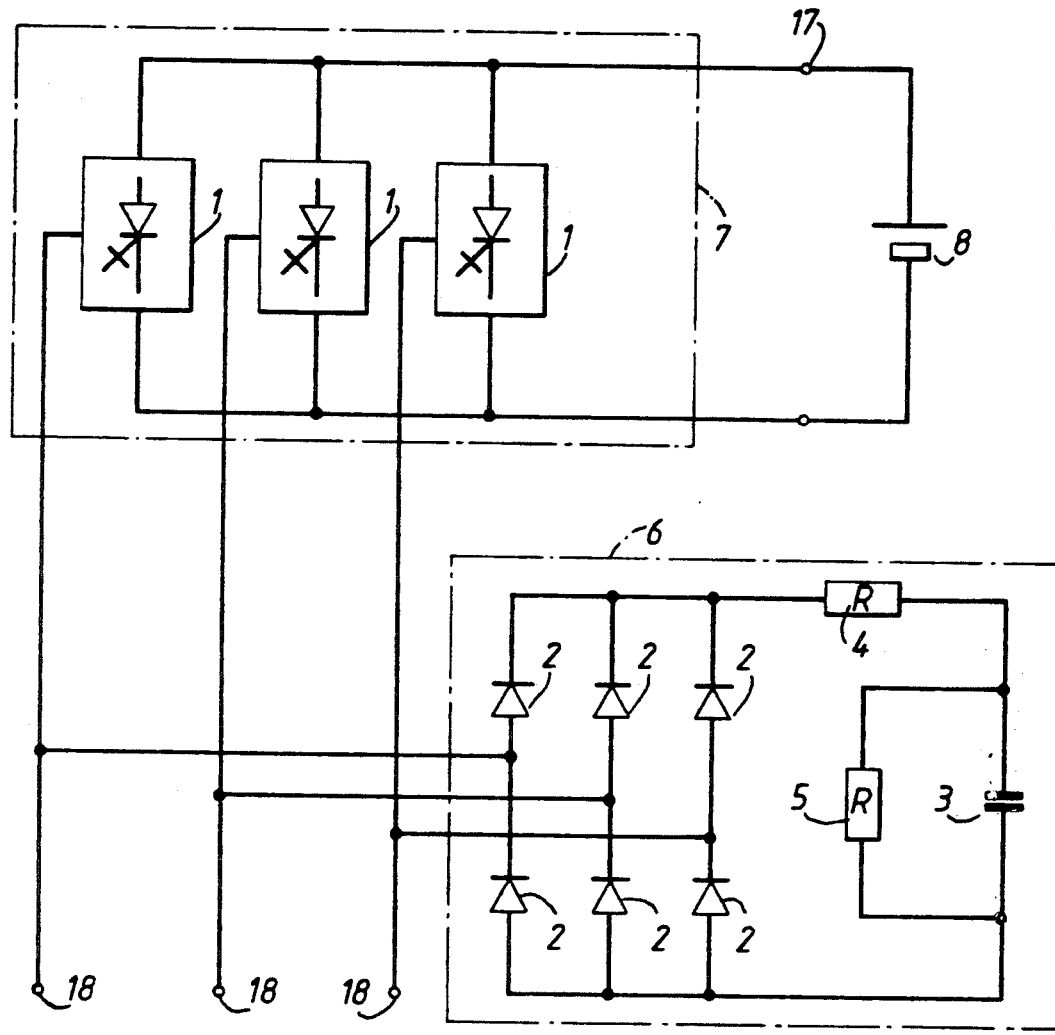
FIG. 9 is a block diagram of a prior art protection device.

FIG. 8 shows another modification of the present invention where a single reactor is used for plural arms. Each of the arms includes switching elements, flywheel diodes and a snubber circuit in a fashion similar to that shown in FIG. 1. However, in this case only a single reactor is provided and is commonly connected to each of the arms.

Other modifications of the present invention may be utilized with the same effect being provided. For example, a different energy storage device may be utilized in place of capacitor 42. Also, switching elements other than GTOs may be utilized.

Obviously, numerous modifications and variations of the present invention are possible in light of the above teachings. It is therefore to be understood that within the scope of the appended claims, the invention may be practiced otherwise than as specifically described herein.

What is claimed as new and desired to be Secured by Letters Patent of the United States is:

1. An overvoltage protection circuit for a power converter comprising:
   at least one arm module being connected between d.c. terminals, said arm module having at least one switching element being connected with an anode reactor in series;
   an energy storage means being connected with said anode reactor in series to absorb incoming energy;
   a power regenerating means for regenerating the energy of said energy storage means to said d.c. terminal and maintaining the voltage of said energy storage means to a first predetermined value;
   a voltage detecting means for determining whether the voltage of said energy storage means exceeds a second predetermined value;
   an energy consuming means being connected with said energy storage means in parallel to form a pass having smaller impedance than the impedance of said energy storage means when the voltage of said energy storage means exceeds said second predetermined value.

2. An overvoltage protection circuit for a power converter according to claim 1, wherein said energy consuming means includes a semiconductor switch connected in parallel with said energy storage means.

3. An overvoltage protection circuit for a power converter according to claim 2, wherein said voltage detecting means includes:
   a voltage divider connected in parallel with said energy storage means;
   a comparator for comparing a set voltage with a voltage from said voltage divider; and
   a gate drive circuit for receiving the output of said comparator and for controlling said semiconductor switch.

4. An overvoltage protection circuit for a power converter according to claim 2, wherein said semiconductor switch is a gate turn-off thyristor.

5. An overvoltage protection circuit for a power converter according to claim 2, wherein said semiconductor switch is a light triggered thyristor.

6. An overvoltage protection circuit for a power converter according to claim 1, wherein said power regenerating means includes a regenerating capacitor, and said energy storage means includes an energy storage capacitor having smaller capacity and lower impedance for high frequency current than said regenerating capacitor.

7. An overvoltage protection circuit for a power converter according to claim 1, wherein said anode reactor is connected to a positive direct current terminal.

8. An overvoltage protection circuit for a power converter according to claim 1, wherein said anode reactor is connected to a negative direct current terminal.

9. An overvoltage protection circuit for a power converter according to claim 1, further comprising a second anode reactor with one anode reactor being connected to a positive direct current terminal and the other anode reactor being connected to a negative direct current terminal.

10. An overvoltage protection circuit for a power converter according to claim 1, further comprising additional switching elements connected in parallel with said at least one switching element.

11. An overvoltage protection circuit for a polyphase power converter comprising:
    a plurality of arm modules wherein the number of modules corresponds to the number of phases, said arm modules being connected between direct current terminals;
    a single energy storage means being commonly connected to said arm modules to absorb incoming energy;
    a single power regenerating means for regenerating the energy of said energy storage means to said direct current terminals and maintaining the voltage of said energy storage means to a first predetermined value;
    a voltage detecting means for detecting whether the voltage of said energy storage means exceeds a second predetermined value;
    an energy consuming means being connected with said energy storage means in parallel to form a pass having smaller impedance than the impedance of said energy storage means when the voltage of said energy storage means exceeds said second predetermined value.

12. An overvoltage protection circuit for a multiplexed power converter comprising:
    a multiplexer transformer having a primary winding and a plurality of secondary windings;
    a plurality of power converters being connected to each of said secondary windings and connected between direct current terminals;
    a single energy storage means being commonly connected to said power converters to absorb incoming energy;
    a single power regenerating means for regenerating the energy of said energy storage means to said direct current terminals and maintaining the voltage of said energy storage means to a first predetermined value;
    a voltage detecting means for detecting whether the voltage of said energy storage means exceeds a second predetermined value;
    an energy consuming means being connected with said energy storage means in parallel to form a pass having smaller impedance than the impedance of said energy storage means when the voltage of said energy storage means exceeds said second predetermined value.

* * * * *